United States Patent [19]

Hänel et al.

[11] Patent Number: 5,164,088

[45] Date of Patent: Nov. 17, 1992

[54] MULTILAYER MEMBRANE AND PROCESS OF MANUFACTURING SAME

[75] Inventors: /Peter Hänel, Bad Vilbel; Harald Helmrich, Frankfurt am Main, both of Fed. Rep. of Germany

[73] Assignee: Metallgesellschaft Aktiengesellschaft, Frankfurt am Main, Fed. Rep. of Germany

[21] Appl. No.: 736,098

[22] Filed: Jul. 26, 1991

[30] Foreign Application Priority Data

Aug. 2, 1990 [DE] Fed. Rep. of Germany ....... 4024517

[51] Int. Cl.$^5$ ...................... B01D 61/36; B01D 67/00
[52] U.S. Cl. ........................ 210/500.39; 210/500.41; 210/500.43; 264/45.1; 264/DIG. 48; 264/DIG. 62
[58] Field of Search .................... 204/98; 210/500.21, 210/500.27, 500.36–500.39, 500.41–500.43

[56] References Cited

U.S. PATENT DOCUMENTS 4,608,141 8/1986 Chlanda et al. ...................... 204/98

Primary Examiner—Frank Sever
Attorney, Agent, or Firm—Michael J. Striker

[57] ABSTRACT

The process of making a multilayer membrane composed of a carrier layer, a porous supporting layer and a separating layer includes making a modified polyvinyl alcohol by decomposing a polyvinyl ester or ether until the proportion of the vinyl alcohol monomer units in the modified polyvinyl alcohol corresponds to that in a material consisting of 80 to 95% of the polyvinyl ester or ether and 20 to 5% of a polyvinyl alcohol obtained by completely decomposing the polyvinyl ester or ether; preparing a composite material consisting of the carrier layer and the porous supporting layer, preparing a dilute aqueous solution containing 1 to 10% by weight of the modified polyvinyl alcohol; preferably storing the dilute solution at temperatures from −10° to +10° C., preferably from 0° to 5° C., for 3 to 20 days, after storing, applying the dilute solution to the supporting layer of the composite material to coat the composite material with the modified polyvinyl alcohol; and after the applying, heating the composite material coated with the modified polyvinyl alcohol at a temperature of from 100° to 180° for 1 to 60 minutes.

22 Claims, No Drawings

MULTILAYER MEMBRANE AND PROCESS OF MANUFACTURING SAME

BACKGROUND OF THE INVENTION

This invention relates to a multilayer membrane and, more particularly, to a multilayer membrane, which consists of a carrier layer, a porous supporting layer and a separating layer. It also relates to process for manufacturing the membrane.

German Patent Application P 40 04 153.0-44 suggests a multilayer membrane which is composed of a carrier layer, a porous supporting layer and a separating layer. The carrier layer consists of fibers of polyamide, polyvinylidene difluoride, polyester and glass, the porous supporting layer consists of a polysulfone, polyimide, polyvinyl alcohol, polyurethane, polyvinylidene difluoride, polyether sulfone, polyacrylonitrile or polyether imide, and the separating layer consists of polyvinyl alcohol and is nonporous and has an ordered structure having a high microcrystalline content, in which the crystallites exhibit in the X-ray diffraction pattern a reflection in a range of 1.2 to 1.5 degrees at diffraction angles of from 19.6 to 20 degrees. German Patent Application P 40 04 153.0-44 also suggests the manufacture of this membrane by a process, in which a composite material consisting of the carrier layer and the porous layer is first made and an aqueous solution, which contains 1 to 10% by weight polyvinyl alcohol and has been stored at $-10°$ to $10°$ C. for 3 to 20 days, is subsequently applied to the supporting layer of the composite material, and finally the composite material coated with the aqueous solution of polyvinyl alcohol is treated at $100°$ to $180°$ C. for one to 60 minutes.

The membrane suggested in German Patent Application P 40 04 153.0-44 has a high constant separating capacity, but further improvements in selectivity and separating capacity of the membrane were desired.

SUMMARY OF THE INVENTION

It is therefore an object of the present invention to provide a multilayer membrane which is of the kind described above and which has a better higher separating capacity than the known membrane and a high selectivity.

Another object of the invention is to provide a method of manufacturing this multilayer membrane.

These, and other, objects of the invention are accomplished in that the carrier layer consists of fibers of polyamide, polyvinylidene difluoride, polyester and glass, the porous supporting layer consists of a polysulfone, polyimide, polyvinyl alcohol, polyurethane, polyvinylidene difluoride, polyether sulfone, polyacrylonitrile or polyether imide, and the separating layer is nonporous and consists of a modified polyvinyl alcohol which is a copolymer of vinyl alcohol and a vinyl ester or ether (i.e. an ester or ether of vinyl alcohol). The proportion of vinyl alcohol monomer units and vinyl ester or ether monomer units in the modified polyvinyl alcohol is the same as in a material consisting of 5 to 20% by weight of the polyvinyl ester or ether made by polymerizing the vinyl ester or ether used to make the copolymer and 95 to 80% by weight polyvinyl alcohol. The membrane in accordance with the invention has a high selectivity and a very high separating capacity, which is constant also in continuous operation.

European Patent Specification 96 339 discloses a composite membrane comprising a nonporous separating layer made of a first polymer and a porous supporting layer made of a second polymer. The nonporous separating layer consists of a cross-linked polyvinyl alcohol and the polymer used for the separating layer of the membrane has not entered the pore of the supporting layer. In accordance with European Patent Specification 96 339 a polyvinyl alcohol is used which has the highest possible degree of saponification, e.g., in excess of 98% or in excess of 99%. The molecular weights of the polymers are not critical, provided that the formation of a film and of a membrane is guaranteed. Conventional molecular weights are reported as being in a range from 15,000 to 200,000 Daltons. But the multilayer membrane of the present invention having the separating layer comprising a modified polyvinyl alcohol, which is a copolymer of vinyl alcohol and a vinyl ester or ether in the proportions described above, has a high selectivity in conjunction with a very high and constant separating capacity, which is much higher than that of the known membrane.

Furthermore, in the modified polyvinyl alcohol of the separating layer described herein, the vinyl alcohol monomer units with their hydroxyl groups, on the one hand, and the vinyl ester or ether monomer units, on the other hand, are distributed in blocky form in the modified polyvinyl alcohol macromolecule. This modified polyvinyl alcohol can desirably be made by a partial decomposition of a polyvinyl ester or polyvinyl ether and, when processed to form a multilayer membrane, has a separating capacity which is extremely high compared with the known state of the art.

Furthermore, advantageously the carrier layer of the multilayer membrane has a thickness of 30 to 500 micrometers, the porous supporting layer has a thickness of 30 to 200 micrometers and the nonporous separating layer has a thickness of 0.5 to 5 micrometers. This type of membrane exhibits the particularly good properties of high mechanical strength and an almost constant separating capacity in continuous operation.

According to the invention the multilayer membrane is made in a manufacturing process including the steps of preparing a composite material made from the carrier layer and the porous supporting layer composed as described above, preparing a dilute aqueous solution containing 1 to 10% by weight of the modified polyvinyl alcohol described above, advantageously storing the dilute solution, or an undiluted solution used to prepare the dilute solution, at temperatures from $-10°$ to $+10°$ C., preferably from $0°$ to $5°$ C., for 3 to 20 days, applying the dilute solution to the supporting layer of the composite material to coat the composite material with the aged modified polyvinyl alcohol, and after the applying, heating the composite material coated with the modified polyvinyl alcohol at a temperature of from $100°$ to $180°$ for 1 to 60 minutes to form the separating layer. Particularly good properties of the multilayer membrane of the present invention are believed to be due to the synergistic coaction of the aging process during storing and of the polyvinyl ester or polyvinyl ether monomer units contained in the modified polyvinyl alcohol.

According to another embodiment of the present invention, the aqueous solution of the modified polyvinyl alcohol, before it is stored, advantageously has a molecular weight of 50,000 to 1,000,000 Daltons. When the molecular weight of the modified polyvinyl alcohol falls in this range, the separating layer has a particularly high mechanical strength.

According to a further embodiment of the invention the method of making the dilute aqueous solution applied to the composite material includes the steps of making a concentrated aqueous solution containing from 10 to 30% by weight of the modified polyvinyl alcohol as described above, storing the concentrated solution at −10° C. to 20° C. for 3 to 20 days and, after the storing of the concentrated solution, diluting the concentrated solution to form the dilute solution.

Surprisingly it has been found that the favorable influence of long-term storage of the aqueous solution on the properties of the separating layer is also obtained, if the concentrated aqueous solution of the modified polyvinyl alcohol, which is a copolymer of vinyl alcohol monomer units and vinyl ester or ether monomer units is stored at temperatures from −10° to 10° C. for 3 to 20 days and only immediately before the application is diluted to a concentration of 1 to 10% by weight of the modified polyvinyl alcohol.

In another embodiment of the present invention, 0.01 to 0.1% by weight of a wetting agent are desirably added to the aqueous solution of the modified polyvinyl alcohol immediately before it is applied to the composite material. This results in an effective and uniform wetting of the porous supporting layer.

Also in accordance with the present invention a cross-linking agent in an amount of 1 to 10% by weight, based on the modified polyvinyl alcohol content of the solution, is added to the aqueous solution of polyvinyl alcohol immediately before that solution is applied to the composite material. It is already known to vary the properties of the separating layer using a cross-linking agent as described above according to the requirements of the separating layer. The cross-linking agents used in the present invention include di- or multifunctional carboxylic acids, aldehydes and halogenated hydrocarbons.

In an additional embodiment of the present method for making a multilayer membrane, the composite material is irradiated with microwaves before it is treated. This microwave irradiation produces a comparatively fast drying of the separating layer and is continued until the separating layer is substantially dry, so that the effect of the subsequent treatment at an elevated temperature, which particularly results in the uniform formation of an ordered microcrystalline structure, is not adversely affected by evaporation of water from the separating layer.

To avoid pore formation within the separating layer that layer can be desirably formed in a plurality of partial steps (each of which consists of applying the dilute solution and a thermal treatment). Surprisingly it has been found that the separating layers formed in partial steps have no internal interfaces.

Particularly effective separating layers are obtained if, in accordance with the present invention, polyvinyl acetate is used as a polyvinyl ester or polyvinyl isobutyl ether is used as a polyvinyl ether from which the modified polyvinyl alcohol is made. The modified polyvinyl alcohol which contains 5 to 20% by weight of the polyvinyl ester or polyvinyl ether monomer units is produced in accordance with another embodiment of the present invention by an acid or alkaline partial saponification of the polyvinyl ester or by an acid partial decomposition of a polyvinyl ether.

The multilayer membrane according to the present invention can be used to special advantage for separating liquid, vaporous and gaseous mixtures, During a long-term use of that membrane there is no undesirable decrease of the separating capacity and the membrane will retain its mechanical properties even in long-term operation. The membrane has been used with special satisfaction in pervaporating processes.

The subject matter of the present invention will now be explained more in detail with reference to an example, but the appended claims defining the scope of the invention should not be considered as being further limited by the detailed features of the example provided below.

EXAMPLE

1. Multilayer Membrane Preparation

Polyvinyl acetate is partly saponified to produce a modified polyvinyl alcohol until the modified polyvinyl alcohol contains 8% by weight vinyl acetate monomer units and has a molecular weight of about 100,000 Daltons. An aqueous 15% concentrated solution of that modified polyvinyl alcohol is prepared and stored at a temperature of +10° C. for 14 days. That concentrated solution is diluted with water to form a dilute aqueous solution containing 5% by weight of the modified polyvinyl alcohol. Together with the water, 0.1% by weight of a wetting agent and 4% by weight 1,3-dichloropropanol are added. That solution is applied to a composite material comprising a supporting layer of polyacrylonitrile and a carrier layer of a polyester woven fabric.

The separating layer is dried at 140° C. for 30 minutes and, when dried, has a thickness of about 2 micrometers. That multilayer membrane is used for separation of various mixtures.

2. Separation Results using the Multilayer Membrane

A mixture of 90% by weight ethanol and 10% by weight water is separated into its components by pervaporation at 88° C. and under a permeate pressure of 10 mbars. The water passed as a permeate through the membrane at a flow rate of 1.63 kg.m$^2$/h contains 1.2% by weight ethanol. Under the same conditions the permeate flow rate through a membrane as suggested in German Patent Application P 40 04 153.0-44 amounted to 0.8 kg/m$^2$/h and the water passing as a permeate through the membrane contained 0.3% by weight ethanol. This shows that the membrane in accordance with the invention has a significantly higher separating capacity and only a slightly lower selectivity than the known membrane. On the other hand, the selectivity of the membrane in accordance with the present invention is still very high for the performance of a separating process on a commercial scale.

A mixture of 99% by weight butyl acetate and 1% by weight water is separated into its components by pervaporation at a temperature of 88° C. and under a permeate pressure of 10 mbars. Water, which contains less than 1% by weight butyl acetate, passes as a permeate through the membrane as a permeate at a permeate flow rate of 0.5 kg water per m$^2$-h.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a multilayer membrane composed of a carrier layer, a porous supporting layer and a separating layer, the improvement wherein said carrier layer consists essentially of fibers of a material selected from the group consisting of polyamide, polyvinylidene difluoride, polyester and glass, the porous supporting layer consists essentially of a member selected from the group consisting of polysulfone, polyvinylidene difluoride, polyethersulfone, polyimide, polyvinyl alcohol, polyurethane, polyacrylonitrile and polyether imide, and the separating layer consists essentially of a nonporous material made of a modified polyvinyl alcohol consisting essentially of a copolymer of vinyl alcohol and a member selected from the group consisting of vinyl ethers and vinyl esters, so that said copolymer contains vinyl alcohol monomer units and vinyl ether or ester monomer units, the proportion of the vinyl alcohol monomer units in the modified polyvinyl alcohol corresponding to that in a material consisting of 95 to 80% of polyvinyl alcohol and 5 to 20% by weight of a polyvinyl ester or ether made by polymerizing the vinyl ester or ether used to make the copolymer.

2. The improvement as defined in claim 1, wherein said copolymer consists essentially of modified polyvinyl alcohol macromolecules in which said vinyl alcohol monomer units and said vinyl ester or ether monomer units are arranged in blocky form.

3. The improvement as defined in claim 1, wherein the carrier layer has a thickness of from 30 to 500 micrometers, the porous supporting layer has a thickness of from 30 to 200 micrometers and the separating layer has a thickness of from 0.5 to 5 micrometers.

4. A process of making a multilayer membrane composed of a carrier layer, a porous supporting layer and a separating layer, the process comprising the steps of:
 a. preparing a composite material consisting essentially of a carrier layer consisting essentially of fibers of a material selected from the group consisting of polyamides, polyvinylidene difluorides, polyesters and glasses and a porous supporting layer consisting essentially of a member selected from the group consisting essentially of polysulfones, polyvinylidene difluorides, polyether sulfones, polyimides, polyvinyl alcohols, polyurethanes, polyacrylonitriles and polyether imides;
 b. preparing a dilute aqueous solution containing 1 to 10% by weight of a modified polyvinyl alcohol consisting essentially of a copolymer of a vinyl ester or vinyl ether with vinyl alcohol, the proportion of the vinyl alcohol in the modified polyvinyl alcohol corresponding to that in a material consisting of 95 to 80% of polyvinyl alcohol and 5 to 20% by weight of a polyvinyl ester or ether made by polymerizing the vinyl ester or ether used to make the copolymer;
 c. applying the dilute solution to the supporting layer of the composite material to coat the composite material with the modified polyvinyl alcohol; and
 d. after said applying, heating the composite material coated with the modified polyvinyl alcohol at a temperature of from 100o to 180o for 1 to 60 minutes to form the separating layer.

5. A process according to claim 4, further comprising storing said dilute solution prepared in step b) for from 3 to 20 days at temperatures of from −10° to 10° C. prior to said applying in step c.

6. A process according to claim 5, wherein said storing is at temperatures of from 0° to 5° C.

7. A process according to claim 4, wherein said modified polyvinyl alcohol in said dilute solution has a molecular weight of from 50,000 to 1,000,000 Daltons before said storing.

8. A process according to claim 4, wherein said preparing of said dilute solution includes the steps of making a concentrated aqueous solution containing from 10 to 30% by weight of said modified polyvinyl alcohol; storing said concentrated solution at −10° C. to 20° C. for 3 to 20 days and, after said storing said concentrated solution, diluting said concentrated solution to form said dilute solution.

9. A process according to claim 8, wherein said storing occurs at a temperature of from 5° to 10° C.

10. A process according to claim 4, further comprising adding 0.01 to 0.10% by weight of a wetting agent to said dilute solution, before said applying to the composite material.

11. A process according to claim 4, further comprising adding 1 to 10% by weight cross-linking agent to said dilute solution, before said applying to the composite material.

12. A process according to claim 4, further comprising irradiating said composite material coated with said modified polyvinyl alcohol with microwaves to dry the separating layer before said heating.

13. A process according to claim 4, including making the separating layer in a plurality of partial steps.

14. A process according to claim 4, wherein said polyvinyl ester consists essentially of polyvinyl acetate.

15. A process according to claim 4, wherein said modified polyvinyl alcohol is made by an acid partial saponification of the polyvinyl ester.

16. A process according to claim 4, wherein said partial modified polyvinyl alcohol is made by a basic partial saponification of the polyvinyl ester.

17. A process according to claim 4, wherein said partial modified polyvinyl alcohol is made by a decomposition of the polyvinyl ether.

18. A process according to claim 4, wherein said polyvinyl ether includes polyvinyl isobutyl ether.

19. A multilayer membrane prepared according to the process of claim 4.

20. In a multilayer membrane composed of a carrier layer consisting of fibers of a material selected from the group consisting of polyamide, polyvinylidene difluoride, polyester and glass; a porous supporting layer consists of a member selected from the group consisting of polysulfone, polyvinylidene difluoride, polyethersulfone, polyimide, polyvinyl alcohol, polyurethane, polyacrylonitrile and polyether imide; and a separating layer made of a nonporous material, the improvement wherein the nonporous material is made of a copolymer of vinyl alcohol and a member selected from the group consisting of vinyl ethers and vinyl esters so that said copolymers contains vinyl alcohol monomer units and vinyl ether or ester monomer units, the proportion of the vinyl alcohol monomer units in the modified polyvinyl alcohol corresponding to that in a material consisting of 95 to 80% of polyvinyl alcohol and 5 to 20% by weight of a polyvinyl ester and ether made by polymerizing the vinyl ester or ether used to make the copolymer such that the multilayer membranes has properties enabling pervaporation.

21. The improvement as defined in claim 20, wherein the carrier layer has a thickness of from 30 to 500 micrometers, the porous supporting layer has a thickness of from 30 to 200 micrometers and the separating layer has a thickness of from 0.5 to 5 micrometers.

22. The improvement as defined in claim 20, wherein said copolymer is a block copolymer.

* * * * *